(12) United States Patent
Liu et al.

(10) Patent No.: US 11,304,235 B2
(45) Date of Patent: Apr. 12, 2022

(54) METHOD AND DEVICE FOR DATA TRANSMISSION

(71) Applicant: Telefonaktiebolaget LM Ericsson (publ), Stockholm (SE)

(72) Inventors: Jinhua Liu, Beijing (CN); Jan Christoffersson, Luleå (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 0 days.

(21) Appl. No.: 16/332,713

(22) PCT Filed: Mar. 13, 2018

(86) PCT No.: PCT/CN2018/078825
§ 371 (c)(1),
(2) Date: Mar. 12, 2019

(87) PCT Pub. No.: WO2018/201803
PCT Pub. Date: Nov. 8, 2018

(65) Prior Publication Data
US 2019/0364600 A1    Nov. 28, 2019

(30) Foreign Application Priority Data

May 5, 2017  (WO) ................ PCT/CN2017/083161

(51) Int. Cl.
*H04W 74/08* (2009.01)
*H04W 72/04* (2009.01)
(Continued)

(52) U.S. Cl.
CPC ..... *H04W 74/0833* (2013.01); *H04W 72/042* (2013.01); *H04W 72/0446* (2013.01); *H04W 72/12* (2013.01); *H04W 76/27* (2018.02)

(58) Field of Classification Search
CPC ........... H04W 74/0833; H04W 72/042; H04W 72/0446; H04W 72/12; H04W 76/27
See application file for complete search history.

(56) References Cited

U.S. PATENT DOCUMENTS 8,923,218 B2    12/2014  Luo et al.
2009/0028260 A1*  1/2009  Xiao ..................... H04L 5/0044
                                                            375/260
(Continued)

FOREIGN PATENT DOCUMENTS

CN    102685892 A    9/2012
CN    104936291 A    9/2015
(Continued)

OTHER PUBLICATIONS

Further considerations of random access in NR: 3GPP TSG-RAN WG2 97 meeting: R2-1701721, Intel Corporation, Athens, Greece, Feb. 13-17, 2017 (Year: 2017).*

(Continued)

*Primary Examiner* — Noel R Beharry
*Assistant Examiner* — Mohammed M Murshid
(74) *Attorney, Agent, or Firm* — Christopher & Weisberg, P.A.

(57) ABSTRACT

A method and device for data transmission. A terminal device determines a desired resource for transmitting message 3 according to the capability of the terminal device and the size of message 3; and transmits a request for the desired resource via message 1 transmission. With the method and the device, overhead and delay of small data transmission may be reduced, larger data size transmission in RRC inactive state may be supported, and coverage may be increased.

17 Claims, 4 Drawing Sheets

(51) Int. Cl.
    *H04W 72/12*    (2009.01)
    *H04W 76/27*    (2018.01)

(56) References Cited

U.S. PATENT DOCUMENTS

| | | | | |
|---|---|---|---|---|
| 2010/0238831 | A1* | 9/2010 | Jeong | H04W 52/267 |
| | | | | 370/252 |
| 2015/0078264 | A1* | 3/2015 | Han | H04W 36/0058 |
| | | | | 370/329 |
| 2018/0220450 | A1* | 8/2018 | Aiba | H04W 72/0446 |
| 2018/0242319 | A1* | 8/2018 | Akkarakaran | H04W 72/042 |
| 2019/0320468 | A1* | 10/2019 | Svedman | H04W 74/0833 |
| 2019/0380154 | A1* | 12/2019 | Wei et al. | |
| 2020/0021420 | A1* | 1/2020 | Li | H04L 5/0007 |
| 2020/0022038 | A1* | 1/2020 | Han | H04W 74/006 |
| 2020/0037184 | A1* | 1/2020 | Harada | H04W 80/08 |

FOREIGN PATENT DOCUMENTS

| | | |
|---|---|---|
| CN | 105359613 A | 2/2016 |
| CN | 105814939 A | 7/2016 |
| JP | 2016028475 A | 2/2016 |
| WO | 2016032077 A1 | 3/2016 |

OTHER PUBLICATIONS

Intel Corporation, Further considerations of random access in NR: 3GPP TSG-RAN WG2 97 meeting, R2-1701721, Athens, Greece, Feb. 13-17, 2017 (Year: 2017).*

EPO issued Extended European Search Report for Application No./Patent No. 18794858.3-1215 / 3498017 PCT/CN2018078825—dated May 31, 2019.

3GPP TSG-RAN WG2 Meeting #93bis; Dubrovnik, Croatia; Source: ZTE; Title: Further analysis on preamble transmission in NB-IoT (R2-162360)—Apr. 11-15, 2016.

Communication Pursuant to Article 94(3) EPC issued for Application No. 18 794 858.3-1215—Jul. 28, 2020.

Examination Report issued by Intellectual Property India for Application No. 201947044452—dated Oct. 5, 2021.

PCT Notification of Transmittal of the International Search Report and the Written Opinion of the International Searching Authority, or the Declaration for International application No. PCT/CN2018/078825—dated Jun. 4, 2018.

3GPP TSG-RAN WG2 97 meeting; Athens, Greece; Source: Intel Corporation; Title: Further considerations of random access in NR (R2-1701721)—Feb. 13-17, 2017.

* cited by examiner

METHOD AND DEVICE FOR DATA TRANSMISSION

PRIORITY

This nonprovisional application is a US. National Stage Filing under 35 U.S.C. § 371 of International Patent Application Serial No, PCT/CN2018/078825 filed Mar. 13, 2018 and entitled "Method and Device For Data Transmission" which claims priority to PCT/CN2017/083161 filed May 5, 2017 both of which are hereby incorporated by reference in their entirety.

TECHNICAL FIELD

Embodiments of the present disclosure generally relate to the field of communications, and more particularly, to a method and device for data transmission.

BACKGROUND

For new radio (NR) system, RRC_inactive state is a new user equipment (UE) state. For a UE in this state, the radio resource control (RRC) context of the UE is stored in the radio access network (RAN) side and the UE can initiate random access (RA) for either radio connection setup or small data transmission in uplink (UL) by sending a RRC-Context-ID to the network. The network then determines where the RRC context is stored and fetch the RRC context for the UE according to the received RRC-Context-ID.

For NR system, it was agreed that the 4-step RA procedure will be a baseline. There are 4 messages for radio link setup and the detail message design is still to be determined in NR system.

In long term evolution (LTE) system, a fundamental requirement for any cellular system is the possibility for the terminal to request a connection setup, commonly referred to as random access. A terminal may perform random access on its primary component carrier only. Either a contention based or a contention-free scheme can be used. Contention-based random access uses a four-step procedure with the following steps:

first step: a, the transmission of a random-access preamble, allowing the network (e.g. eNodeB (eNB)) to estimate the transmission timing of the terminal; uplink synchronization is necessary as the terminal otherwise cannot transmit any uplink data;

second step: b, the network transmits a timing advance command (TAC) to adjust the terminal transmit timing, based on the timing estimate obtained in the first step; in addition to establishing uplink synchronization the second step also assigns uplink resources to the terminal to be used in the third step in the random-access procedure;

third step: c, the transmission of the mobile-terminal identity (ID) to the network using the uplink shared channel (UL-SCH) similar to normal scheduled data; the exact content of this signaling depends on the state of the terminal, in particular whether it is previously known to the network or not; and fourth step: d, the final step consists of transmission of a contention-resolution message from the network to the terminal on the downlink shared channel (DL-SCH); this step also resolves any contention due to multiple terminals trying to access the system using the same random-access resource.

In the above, the first step is random access channel (RACH) request (i.e. random access preamble) transmission from UE side and the second step is random access response transmission from eNB side. There are some time mapping rules between them related with random access response (RAR) window parameter broadcast by the eNB. The RAR transmission procedure is shown in FIG. 1. When the eNB detects the RACH request, it will transmit an RAR in the configured window after 3 ms. If the RAR is not received within the window, the UE will send the RACH request again.

In NR system, there will be many UEs in RRC_inactive state. To reduce the signaling and delay for radio connection setup for small data transmission in UL, the NR system will support UL small data transmission for a UE in RRC-inactive state (referred to as inactive UE). For instance, the UL data can be multiplexed with the RRC signaling in message 3.

For allocation of proper UL grant for message 3, the network (e.g. gNB) shall firstly know UL data block size, i.e. the message 3 size.

In LTE system, the physical random access channel (PRACH) preamble partition is used for rough message 3 size indication. For message 3 size smaller than x bits, the UE shall use a random access preamble from random access group A, otherwise the UE shall use a random access preamble from random access group B. The eNB allocates a small UL grant for the UE when a random access preamble from group A is detected. Otherwise, if a random access preamble from group B is detected by the eNB, the eNB can allocate a relatively larger UL grant for message 3 transmission.

In NR system, there will be more options to indicate the message 3 size and a finer message 3 size granularity can be supported. In addition to use random access preamble partition, one can use e.g. subframe number of system frame number when the preamble is transmitted to indicate the message 3 size.

SUMMARY

It was found that when a message 3 size report method with finer granularity via message 1 transmission is available, the scheduling method for UL small data transmission shall be enhanced as well to handle data transmission of different sizes. For inactive UEs, the channel conditions are not known so the scheduler needs to use a low coding rate, meaning that the size of the transport block will be limited when transmitting data together with message 3. This will lead to a number of issues.

One difficulty is when the UE indicates "large" small data, then it may happen that one scheduled transmission within the minimum bandwidth for synchronization signal (SS) block transmission may not be large enough to empty the UE buffer, meaning that the UE may need to transit to connected state in order to empty its buffer.

Another issue is that the UE capability with respect to carrier bandwidth is not known to the network, so the network (e.g. gNB) cannot allocate physical resource blocks (PRBs) outside the minimum bandwidth for SS block transmission. This can be problematic when transmitting common control channel service data unit (CCCH SDU) (RRC-ConnectionRequest or RRCConnectionResumeRequest) which is not segmented in LTE system, meaning that it needs to be transmitted in one transmission time interval (TTI). Extending these messages (e.g. adding new parameters to them) may make it difficult or impossible to multiplex data simultaneously within the granted resource.

Also, coverage will be an issue since transmitting a large message on limited bandwidth will require a higher coding rate, which is a drawback for coverage.

In order to solve at least part of the above problems, methods, apparatus, devices and computer programs are provided in the present disclosure. It may be appreciated that embodiments of the present disclosure are not limited to a wireless system operating in NR network, but could be more widely applied to any application scenario where similar problems exist.

Various embodiments of the present disclosure mainly aim at providing methods, devices and computer programs for data transmission between a transmitter and a receiver, for example, in a shared frequency band. Either of the transmitter and the receiver could be, for example, a terminal device or a network device. Other features and advantages of embodiments of the present disclosure will also be understood from the following description of specific embodiments when reading in conjunction with the accompanying drawings, which illustrate, by way of examples, the principles of embodiments of the present disclosure.

In general, embodiments of the present disclosure provide a terminal device to report a desired scheduling scheme as well as the message 3 size via message 1 transmission, so that the network device can perform scheduling based on the joint consideration of message 3 size and the desired scheduling scheme. In one example, the terminal device can request multiple-slot scheduling via message 1 transmission when a message 3 size is larger than x1 bits; in another example, the terminal device can request to be scheduled in a larger bandwidth than the minimum bandwidth for SS block transmission when a message 3 size is larger than x2 bits. The network device can configure the rules and parameters for the terminal device to determine message 1 transmission.

In a first aspect, there is provided a method in a terminal device for data transmission, includes, determining a desired resource for transmitting message 3 according to the capability of the terminal device and the size of message 3; and transmitting a request for the desired resource via message 1 transmission.

In one embodiment, the request indicates the size of message 3 and the capability of the terminal device.

In one embodiment, the desired resource is number of slots, the number of slots is determined according to the size of the message 3 and multiple-slot scheduling capability supported by the terminal device, where the multiple-slot scheduling capability is that the terminal device is able to be scheduled with multiple slots for data transmission.

In this embodiment, the method further includes, determining a PRACH resource group according to the size of the message 3, from which a random access preamble is selected for message 1 transmission.

In this embodiment, the method further includes, monitoring a DCI format for multiple-slot scheduling if the multiple-slot scheduling is requested in the message 1 transmission.

In this embodiment, the method further includes, monitoring a DCI format for single slot scheduling if the multiple-slot scheduling and the single slot scheduling are using different DCI formats.

In another embodiment, the desired resource is number of PRBs, the number of PRBs is determined according to the size of the message 3 and schedulable bandwidth capability supported by the terminal device, where the schedulable bandwidth capability is that the terminal device is able to support data transmission or receiving using the allocated PRBs within the schedulable bandwidth.

In this embodiment, the method further includes, determining a PRACH resource group according to the size of the message 3, from which a random access preamble is selected for message 1 transmission.

In this embodiment, the method further includes, determining a DCI format for monitoring according to transmission resource of message 1.

In this embodiment, the method further includes, determining a DCI search space according to transmission resource of message 1.

In a second aspect, there is provided a method in a network device for data transmission, includes, allocating resource for transmitting message 3 for a terminal device according to a request for a desired resource for transmitting message 3 transmitted by the terminal device via message 1 transmission, wherein, the request indicates the capability of the terminal device and the size of message 3.

In one embodiment, the desired resource is number of slots, and the allocated resource is frequency resources in multiple slots, which is smaller or equal to the number of slots determined according to the size of message 3.

In another embodiment, the desired resource is number of PRBs, and the allocated resource is PRBs within schedulable bandwidth supported by the terminal device.

In this embodiment, the allocating granularity of the system bandwidth is adapted with respect to the schedulable bandwidth.

In this embodiment, the DCI search spaces are different for different schedulable bandwidths.

In a third aspect, there is provide a terminal device, including a processor and a memory, wherein the memory containing instructions executable by the processor whereby the terminal device is operative to perform a method for data transmission according to the first aspect.

In a fourth aspect, there is provide a network device, including a processor and a memory, wherein the memory containing instructions executable by the processor whereby the network device is operative to perform a method for data transmission according to the second aspect.

In a fifth aspect, there is provide a communications system, including: a network device configured to perform a method for data transmission according to the second aspect; and a terminal device configured to perform a method for data transmission according to the first aspect.

According to various embodiments of the present disclosure, overhead and delay of small data transmission may be reduced, larger data size transmission in RRC inactive state may be supported, and coverage may be increased.

BRIEF DESCRIPTION OF THE DRAWINGS

The above and other aspects, features, and benefits of various embodiments of the disclosure will become more fully apparent, by way of example, from the following detailed description with reference to the accompanying drawings, in which like reference numerals or letters are used to designate like or equivalent elements. The drawings are illustrated for facilitating better understanding of the embodiments of the disclosure and not necessarily drawn to scale, in which.

DETAILED DESCRIPTION

Figure 1:
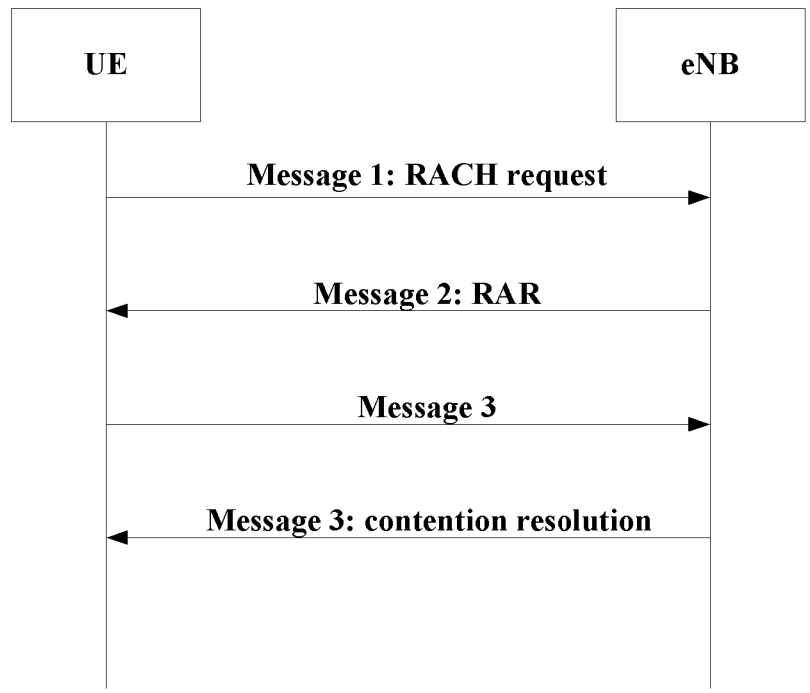
FIG. 1 is a schematic diagram of an example of RA procedure in LTE.

The present disclosure will now be discussed with reference to several example embodiments. It should be understood that these embodiments are discussed only for the purpose of enabling those skilled persons in the art to better understand and thus implement the present disclosure, rather than suggesting any limitations on the scope of the present disclosure.

As used herein, the term "wireless communication network" refers to a network following any suitable communication standards, such as LTE-Advanced (LTE-A), LTE, Wideband Code Division Multiple Access (WCDMA), High-Speed Packet Access (HSPA), NR, and so on. Furthermore, the communications between a terminal device and a network device in the wireless communication network may be performed according to any suitable generation communication protocols, including, but not limited to, Global System for Mobile Communications (GSM), Universal Mobile Telecommunications System (UMTS), Long Term Evolution (LTE), and/or other suitable, and/or other suitable the first generation (1G), the second generation (2G), 2.5G 2.75G the third generation (3G), the fourth generation (4G), 4.5G, the future fifth generation (5G) communication protocols, wireless local area network (WLAN) standards, such as the IEEE 802.11 standards; and/or any other appropriate wireless communication standard, such as the Worldwide Interoperability for Microwave Access (WiMax), Bluetooth, and/or ZigBee standards, and/or any other protocols either currently known or to be developed in the future.

The term "network device" refers to a device in a wireless communication network via which a terminal device accesses the network and receives services therefrom. The network device refers a base station (BS), an access point (AP), or any other suitable device in the wireless communication network. The BS may be, for example, a node B (NodeB or NB), an evolved NodeB (eNodeB or eNB), or gNB, a Remote Radio Unit (RRU), a radio header (RH), a remote radio head (RRH), a relay, a low power node such as a femto, a pico, and so forth. Yet further examples of the network device may include multi-standard radio (MSR) radio equipment such as MSR BSs, network controllers such as radio network controllers (RNCs) or base station controllers (BSCs), base transceiver stations (BTSs), transmission points, transmission nodes. More generally, however, the network device may represent any suitable device (or group of devices) capable, configured, arranged, and/or operable to enable and/or provide a terminal device access to the wireless communication network or to provide some service to a terminal device that has accessed the wireless communication network.

The term "terminal device" refers to any end device that can access a wireless communication network and receive services therefrom. By way of example and not limitation, the terminal device refers to a mobile terminal, user equipment (UE), or other suitable devices. The UE may be, for example, a Subscriber Station (SS), a Portable Subscriber Station, a Mobile Station (MS), or an Access Terminal (AT). The terminal device may include, but not limited to, portable computers, image capture terminal devices such as digital cameras, gaming terminal devices, music storage and playback appliances, a mobile phone, a cellular phone, a smart phone, voice over IP (VoIP) phones, wireless local loop phones, a tablet, a wearable device, a personal digital assistant (PDA), portable computers, desktop computer, image capture terminal devices such as digital cameras, gaming terminal devices, music storage and playback appliances, wearable terminal devices, vehicle-mounted wireless terminal devices, wireless endpoints, mobile stations, laptop-embedded equipment (LEE), laptop-mounted equipment (LME), USB dongles, smart devices, wireless customer-premises equipment (CPE) and the like. In the following description, the terms "terminal device", "terminal", "user equipment" and "UE" may be used interchangeably. As one example, a terminal device may represent a UE configured for communication in accordance with one or more communication standards promulgated by the 3rd Generation Partnership Project (3GPP), such as 3GPP's GSM, UMTS, LTE, and/or 5G standards. As used herein, a "user equipment" or "UE" may not necessarily have a "user" in the sense of a human user who owns and/or operates the relevant device. In some embodiments, a terminal device may be configured to transmit and/or receive information without direct human interaction. For instance, a terminal device may be designed to transmit information to a network on a predetermined schedule, when triggered by an internal or external event, or in response to requests from the wireless communication network. Instead, a UE may represent a device that is intended for sale to, or operation by, a human user but that may not initially be associated with a specific human user.

The terminal device may support device-to-device (D2D) communication, for example by implementing a 3GPP standard for side link communication, and may in this case be referred to as a D2D communication device.

As yet another example, in an Internet of Things (IOT) scenario, a terminal device may represent a machine or other device that performs monitoring and/or measurements, and transmits the results of such monitoring and/or measurements to another terminal device and/or network equipment. The terminal device may in this case be a machine-to-machine (M2M) device, which may in a 3GPP context be referred to as a machine-type communication (MTC) device. As one particular example, the terminal device may be a UE implementing the 3GPP narrow band internet of things (NB-IoT) standard. Particular examples of such machines or devices are sensors, metering devices such as power meters, industrial machinery, or home or personal appliances, for example refrigerators, televisions, personal wearables such as watches etc. In other scenarios, a terminal device may represent a vehicle or other equipment that is capable of monitoring and/or reporting on its operational status or other functions associated with its operation.

As used herein, a downlink, DL transmission refers to a transmission from the network device to a terminal device, and an uplink, UL transmission refers to a transmission in an opposite direction.

References in the specification to "one embodiment," "an embodiment," "an example embodiment," and the like indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

It shall be understood that although the terms "first" and "second" etc. may be used herein to describe various elements, these elements should not be limited by these terms. These terms are only used to distinguish one element from another. For example, a first element could be termed a second element, and similarly, a second element could be termed a first element, without departing from the scope of example embodiments. As used herein, the term "and/or" includes any and all combinations of one or more of the associated listed terms.

The terminology used herein is for the purpose of describing particular embodiments only and is not intended to be liming of example embodiments. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components etc., but do not preclude the presence or addition of one or more other features, elements, components and/or combinations thereof.

In the following description and claims, unless defined otherwise, all technical and scientific terms used herein have the same meaning as commonly understood by one of ordinary skills in the art to which this disclosure belongs.

Now some exemplary embodiments of the present disclosure will be described below with reference to the figures.

Figure 2:
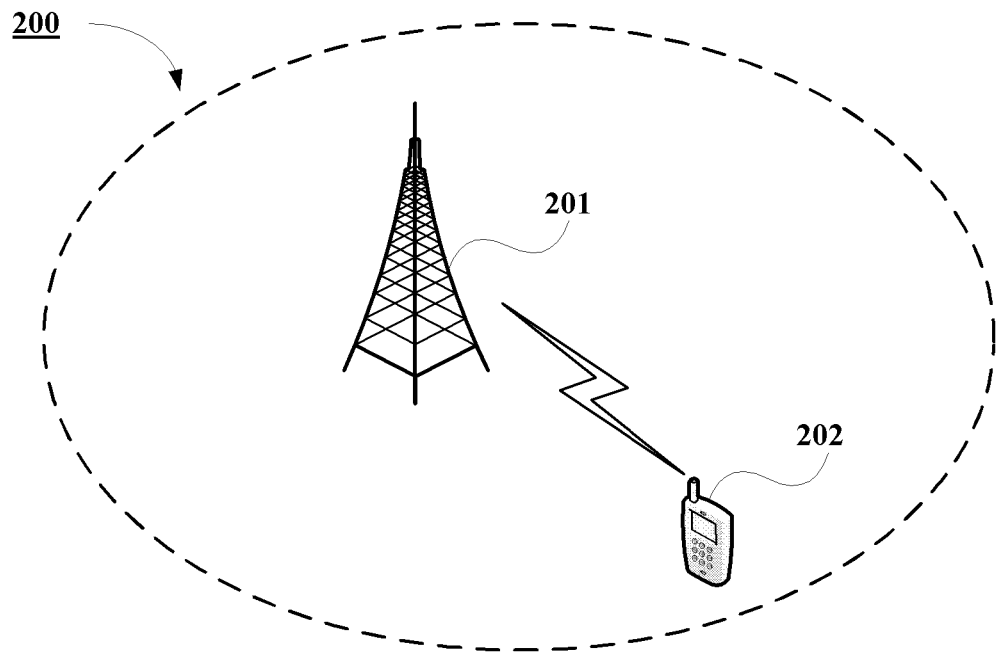
FIG. 2 is a schematic diagram which shows a wireless communication network.

FIG. 2 shows a schematic diagram of a wireless communication network 200 in which embodiments of the disclosure may be implemented. As shown in FIG. 2, the wireless communication network 200 may include one or more network devices, for example network devices 201.

It will be appreciated that the network device 201 could also be in a form of gNB, Node B, eNB, BTS (Base Transceiver Station), and/or BSS (Base Station Subsystem), access point (AP) and the like. The network device 201 may provide radio connectivity to a set of terminal devices or UEs 202-1, 202-2, . . . , 202-N (collectively referred to as "terminal device(s) 202) within its coverage, where N is a natural number.

Although network device 201 illustrated in the example wireless communication network may represent a device that includes a particular combination of hardware components, other embodiments may comprise network nodes with different combinations of components. It is to be understood that a network device may include any suitable combination of hardware and/or software needed to perform the tasks, features, functions and methods disclosed herein.

It is to be understood that the configuration of FIG. 2 is described merely for the purpose of illustration, without suggesting any limitation as to the scope of the present disclosure. Those skilled in the art would appreciate that the wireless communication network 200 may include any suitable number of terminal devices and/or network devices and may have other suitable configurations.

First Aspect of Embodiments

A method for data transmission is provided in an embodiment. The method is implemented at a terminal device as an example.

Figure 3:
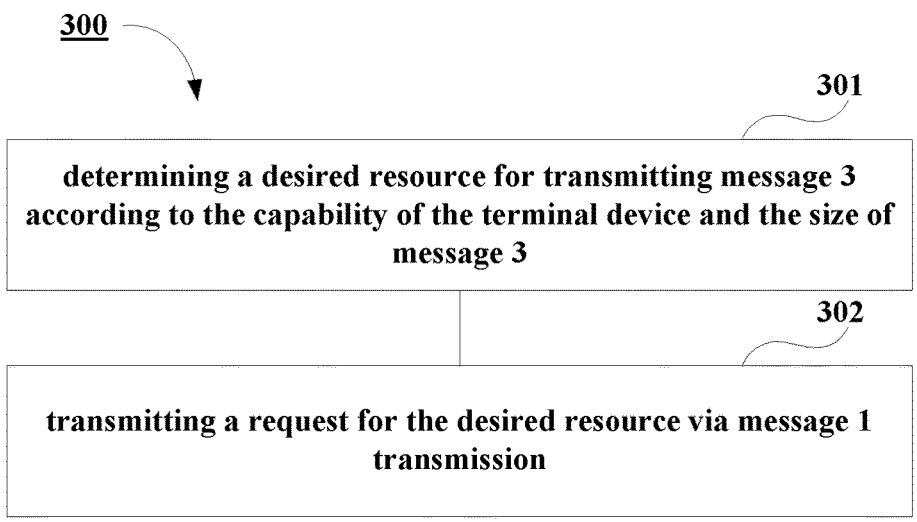
FIG. 3 is a diagram which shows a method for data transmission in accordance with an embodiment of the present disclosure.

FIG. 3 is a diagram which shows a method 300 for data transmission in accordance with an embodiment of the present disclosure, and illustrates the method for data transmission by taking a terminal device as an example.

As shown in FIG. 3, the method 300 includes

Block 301, determining a desired resource for transmitting message 3 according to the capability of the terminal device and the size of message 3; and Block 302, transmitting a request for the desired resource via message 1 transmission.

In Block 301, a relationship between a resource and a message 3 size is preconfigured by the network (e.g. gNB), thus based on the relationship preconfigured by the network, the terminal device may determine the desired resource according to the message 3 size with reference to its capability.

In Block 302, the terminal device may initiate the transmission of the message 1, indicating the capability of the terminal device and the message 3 size. Such an indication or such a request may also be called as desired scheduling scheme, so that the network can perform scheduling based on the desired scheduling scheme, which will be described in other embodiments.

With the method of this embodiment, as the terminal device will request for the desired scheduling scheme and the network will perform scheduling based on the desired scheduling scheme, such as determine scheduling scheme for message 3 as well as small data transmission in UL. Thus, overhead and delay of small data transmission will be reduced, larger data size transmission in RRC inactive state can be supported, and coverage can be increased accordingly.

In an embodiment, the desired resource is number of slots, the number of slots is determined according to the size of the message 3 and multiple-slot scheduling capability supported by the terminal device, where the multiple-slot scheduling capability is that the terminal device is able to be scheduled with multiple slots for data transmission.

In this embodiment, the terminal device may determine the preferred number of slots for message 3 transmission according to the message 3 size and the capability whether to support the multiple-slot scheduling.

In an implementation, when the terminal device supports multiple-slot scheduling, it can determine the number of slots for message 3 transmission according to the message 3 size by looking up a mapping table of message 3 size to number of scheduled slots, and initiate a request for the desired number of slots (i.e. multiple-slot scheduling request), indicating the message 3 size and the capability, thus the network may schedule multiple slots for the terminal device for message 3 transmission as well as small data transmission in UL.

In this embodiment, the RRC message shall be transmitted in the first slot within the scheduled multiple slots.

In this embodiment, the mapping table is preconfigured by the network and stored in the terminal device side. Table 1 shows an example of the mapping table of message 3 size to number of scheduled slots.

TABLE 1

| Index Condition (y3 > y2 > y1) | | Number of scheduled slots | PRACH resource group |
|---|---|---|---|
| 1 | Message 3 size <= y1 bits | 1 | 1 |
| 2 | y2 => Message 3 size > y1 bits | 2 | 2 |
| 3 | y3 => Message 3 size > y2 bits | 4 | 3 |

In Table 1, y1, y2, y3 are constants, which are configured by the network in static manner, dynamic manner, or semi-static manner, this embodiment is not limited thereto.

In this embodiment, the terminal device may further determine a PRACH resource group according to the size of the message 3, from which a random access preamble is selected for message 1 transmission.

As shown in Table 1, Table 1 also shows a column of PRACH resource group corresponding to different message 3 size, thus the terminal device may select the random access preamble for message 1 transmission from this column of PRACH resource group according to message 3 size. As the terminal device and the network are aware of the configuration, when receiving the random access preamble, the network may also know the random access preamble according to the message 3 size indicated by the terminal device.

In this embodiment, resources in the PRACH resource group may be time domain resources, frequency domain resources, or random access preamble, thus the terminal device may select resources from the corresponding PRACH resource group to transmit the message 1. This embodiment does not limit the method for transmitting the message 1, a related art may be referred to.

It should be appreciated that the table 1 is only an example of the relationship of the disclosure, but it is not limited thereto. For example, the relationship between the message 3 size and the number of scheduled slots as well as the PRACH resource group can also be other forms, include other contents, and omit some content therein, etc., this embodiment is not limited thereto.

In this embodiment, the terminal device may further monitor a DCI format for multiple-slot scheduling if the multiple-slot scheduling is requested in the message 1 transmission, so as to obtain downlink control information and downlink data transmitted by the network.

In this embodiment, the terminal device may further monitor a DCI format for single-slot scheduling if the multiple-slot scheduling and the single-slot scheduling are using different DCI formats since the network may still allocate single slot grant for the terminal device even though the terminal device has requested the multiple-slot scheduling.

In this embodiment, the network (e.g. gNB) shall allocate a grant (resource) in response to the request from the terminal device. The gNB can allocate either smaller or exactly the requested number of slots for the terminal device according to the available resources. Which shall be described in other embodiments.

In another embodiment, the desired resource is number of PRBs, the number of PRBs is determined according to the size of the message 3 and schedulable bandwidth capability supported by the terminal device, where the schedulable bandwidth capability is that the terminal device is able to support data transmission or receiving using the allocated PRBs within the schedulable bandwidth.

In this embodiment, the terminal device may request the desired bandwidth (PRBs) based on its schedulable bandwidth capability and message 3 size. For example, when a terminal device requires a certain number of PRBs for message 3 transmission, it is required that the terminal device is able to support the whole schedulable bandwidth for the frequency resource allocation.

In this embodiment, the conditions for the terminal device to determine the message 1 transmission to request a bandwidth for message 3 transmission can be preconfigured. That is to say, the terminal device determines the desired bandwidth (PRBs) for message 3 transmission according to preconfigured conditions, and request the desired bandwidth (PRBs) by indicating the message 3 size and its schedulable bandwidth capability via message 1 transmission.

Table 2 illustrates as one example of conditions to determine message 1 transmission.

TABLE 2

| Index Condition (z3 > z2 > z1) | | Number of desired PRBs | Schedulable PRB index range | PRACH resource group |
|---|---|---|---|---|
| 1 | Message 3 size <= z1 bits | n | −N~+N−1 | 1 |
| 2 | z2 => Message 3 size > z1 bits | 2n | −2N~+2N−1 | 2 |
| 3 | z3 => Message 3 size > z2 bits | 4n | −4N~+4N−1 | 3 |

In Table 2, z1, z2, z3 are constants, which are configured by the network in static manner, dynamic manner, or semi-static manner, this embodiment is not limited thereto.

As one example, if the message 3 size is between z1 and z2, and the terminal device can support at least bandwidth of 4N PRBs, the terminal device can determine a message 1 transmission (i.e. PRACH transmission) using the selected resource from PRACH resource group 2 to request the network (i.e. gNB) to allocate 2n PRBs for message 3 transmission.

In this embodiment, the conditions are illustrated as a form of table, the table is preconfigured by the network and stored in the terminal device side, but the embodiment is not limited thereto, in other embodiments, the conditions can also be other forms.

Figure 4:
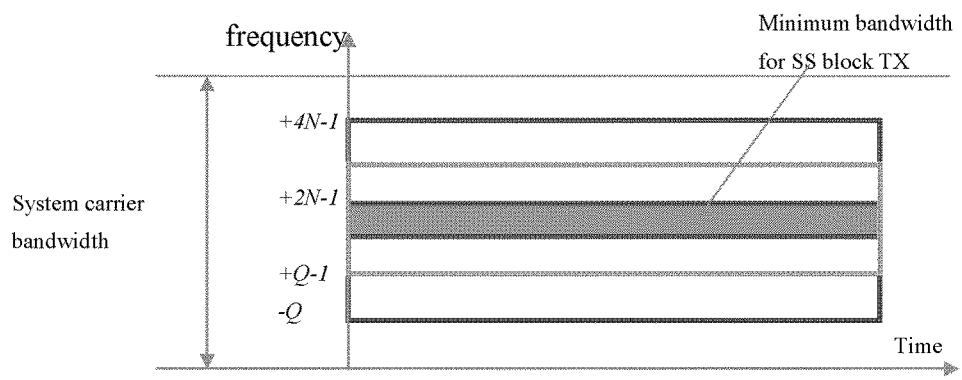
FIG. 4 is a diagram which shows an example of PRB index range for frequency resource allocation for UL small data transmission.

It should be appreciated that the PRB index can be predefined with respect to minimum bandwidth containing SS block transmission. FIG. 4 shows an example of PRB indexing for different schedulable bandwidth ranges with respect to Table 2.

In this embodiment, similar to the former embodiment, the terminal device may further determine a PRACH resource group according to the size of the message 3, from which a random access preamble is selected for message 1 transmission.

As an example, the PRACH resource groups corresponding to different message 3 sizes are included in the above conditions and as shown in Table 2. As functions and implementation of the PRACH resource group have been described in the former embodiment, the content of which being incorporated herein and shall not be described here any further.

In this embodiment, more resource allocation bits can be defined for larger schedulable bandwidth. In this case, different DCI formats are used for different schedulable bandwidths. And the terminal device may further determine the DCI format for monitoring according to the transmission resource of message 1.

In this embodiment, in order to reduce the DCI transmission load in the minimum bandwidth for SS block transmission, the DCI search spaces can be different for different schedulable bandwidths.

In this embodiment, the DCI search spaces for different schedulable bandwidths can be preconfigured, and the terminal device may determine the DCI search space according to the transmission resource of message 1.

In this embodiment, as described above, the transmission resource of message 1 can be selected from the PRACH resource group determined according to the message 3 size.

In the first aspect, the method for data transmission is described in the two above embodiments, in other embodiments, a combination of the schemes described in the first embodiment and the second embodiment can be used. For example, a terminal device can request multiple-slot scheduling in a larger bandwidth rather than single slot transmission in the minimum bandwidth for SS block transmission.

It should be appreciated that only operations related to this disclosure are illustrated in some embodiments. For the sake of simplicity, detail description of other operations is not illustrated in this disclosure.

As can be seen from the above embodiments, overhead and delay of small data transmission will be reduced, larger data size transmission in RRC inactive state can be supported, and coverage can be increased accordingly.

Second Aspect of Embodiments

A method for data transmission is provided in an embodiment. The method is implemented at a network device as an example, and the same contents as those in the first aspect of embodiments are omitted.

Figure 5:
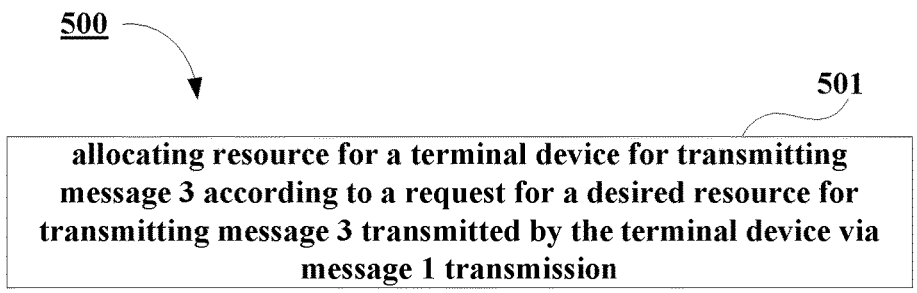
FIG. 5 is another diagram which shows a method for data transmission in accordance with an embodiment of the present disclosure.

FIG. 5 is another diagram which shows a method 500 for data transmission in accordance with an embodiment of the present disclosure, and illustrates the method for data transmission by taking a network device as an example.

As shown in FIG. 5, the method 500 includes Block 501, allocating resource for transmitting message 3 for a terminal device according to a request for a desired resource for transmitting message 3 transmitted by the terminal device via message 1 transmission, wherein, the desired resource is determined by the terminal device according to capability of the terminal device and the size of message 3.

In this embodiment, as described above, the request indicates the capability of the terminal device and the size of message 3, as the network is aware of the mapping relationship between the message 3 size and the desired resource (number of slots or number of PRBs), thus the network device may determine the desired resource requested by the terminal device, and allocate resource for the terminal device according to available resource.

In an implementation, the desired resource is number of slots, and the allocated resource is frequency resources in multiple slots, which is smaller or equal to the number of slots determined according to the size of message 3.

In another implementation, the desired resource is number of PRBs, and the allocated resource is PRBs within schedulable bandwidth supported by the terminal device.

In this aspect of this disclosure, the allocating granularity (i.e. frequency resource allocating granularity) of the bandwidth (PRBs) may be adapted with respect to the schedulable bandwidth. Thus the resource allocation bits can be saved. For instance, the allocating granularity for resource allocation within −2N~+2N−1 for message 3 transmission corresponding to message 1 from PRACH resource group 2 can be twice as that within −N~+N−1 for message 3 transmission corresponding to message 1 from PRACH resource group 1. In such way, the same DCI format can be used for scheduling message 3 transmission in all cases in Table 2. The terminal device shall then determine the allocating granularity according to its message 1 transmission.

In this aspect of this disclosure, the DCI search spaces can be different for different schedulable bandwidths. Such that the DCI transmission load in the minimum bandwidth for SS block transmission can be reduced. And the DCI search spaces for different schedulable bandwidths can be preconfigured.

As can be seen from the above embodiments, overhead and delay of small data transmission will be reduced, larger data size transmission in RRC inactive state can be supported, and coverage can be increased accordingly.

Third Aspect of Embodiments

An apparatus for data transmission is provided in an embodiment. The apparatus may be configured in the terminal device 202, and the same contents as those in the first aspect of embodiments are omitted.

Figure 6:
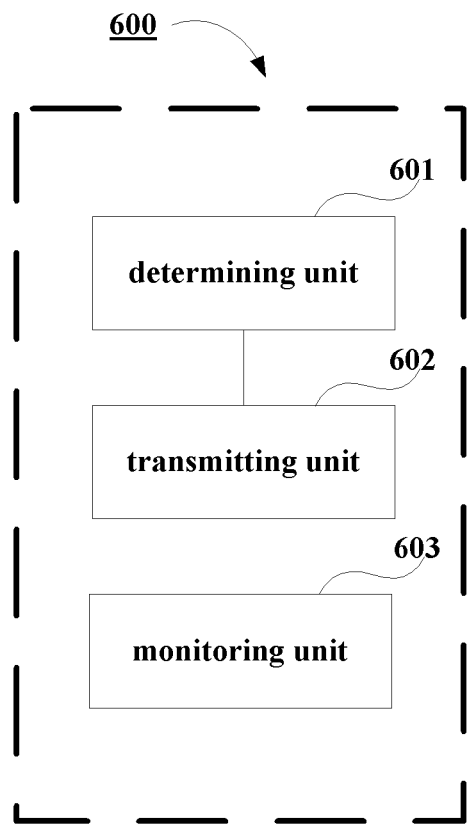
FIG. 6 is a block diagram which shows an apparatus for data transmission in accordance with an embodiment of the present disclosure.

FIG. 6 shows a block diagram of an apparatus 600 for data transmission in accordance with an embodiment of the present disclosure.

As shown in FIG. 6, the apparatus 600 includes: a determining unit 601 configured to determine a desired resource for transmitting message 3 according to the capability of the terminal device and the size of message 3; and a transmitting unit 602 configured to transmit a request for the desired resource via message 1 transmission.

In an embodiment, the request indicates the size of the message 3 and the capability of the terminal device.

In an embodiment, the desired resource is number of slots, the number of slots is determined according to the size of the message 3 and multiple-slot scheduling capability supported by the terminal device, where the multiple-slot scheduling capability is that the terminal device is able to be scheduled with multiple slots for data transmission.

In this embodiment, the determining unit 601 may be further configured to determine a PRACH resource group according to the size of the message 3, from which a random access preamble is selected for message 1 transmission.

In this embodiment, as shown in FIG. 6, the apparatus 600 may further includes a monitoring unit 603, which is configured to monitor a DCI format for multiple slot scheduling if the multiple slot scheduling is requested in the message 1 transmission.

In this embodiment, the monitoring unit 603 may further be configured to monitor a DCI format for single slot scheduling if the multiple slot scheduling and the single slot scheduling are using different DCI formats.

In another embodiment, the desired resource is number of PRBs, the number of PRBs is determined according to the size of the message 3 and schedulable bandwidth capability supported by the terminal device, where the schedulable bandwidth capability is that the terminal device is able to support data transmission or receiving using the allocated PRBs within the schedulable bandwidth.

In this embodiment, the determining unit 601 may further be configured to determine a PRACH resource group according to the size of the message 3, from which a random access preamble is selected for message 1 transmission.

In this embodiment, the determining unit 601 may further be configured to determine a DCI format for monitoring according to transmission resource of message 1.

In this embodiment, the determining unit 601 may further be configured to determine a DCI search space according to transmission resource of message 1.

It should be appreciated that components included in the apparatus 600 correspond to the operations of the method 300. Therefore, all operations and features described above with reference to FIG. 3 are likewise applicable to the components included in the apparatus 600 and have similar effects. For the purpose of simplification, the details will be omitted.

It should be appreciated that the components included in the apparatus 600 may be implemented in various manners, including software, hardware, firmware, or any combination thereof.

In an embodiment, one or more units may be implemented using software and/or firmware, for example, machine-executable instructions stored on the storage medium. In addition to or instead of machine-executable instructions, parts or all of the components included in the apparatus 600 may be implemented, at least in part, by one or more hardware logic components.

For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), and the like.

The apparatus 600 may be a part of a device. But it is not limited thereto, for example, the apparatus 600 may be the terminal device 202, other parts of the terminal device 202, such as transmitter and receiver, are omitted in the FIG. 6.

As can be seen from the above embodiments, overhead and delay of small data transmission will be reduced, larger data size transmission in RRC inactive state can be supported, and coverage can be increased accordingly.

Fourth Aspect of Embodiments

An apparatus for data transmission is provided in an embodiment. The apparatus may be configured in the network device 201, and the same contents as those in the first or second aspect of embodiments are omitted.

Figure 7:
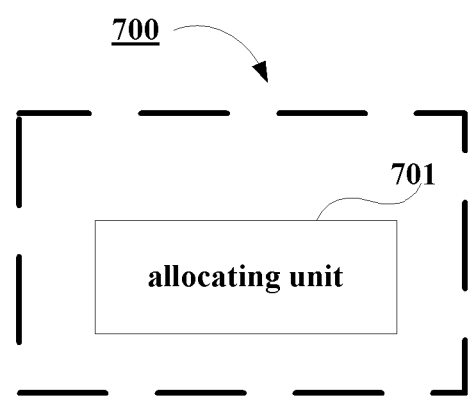
FIG. 7 is another block diagram which shows an apparatus for data transmission in accordance with an embodiment of the present disclosure.

FIG. 7 shows a block diagram of an apparatus 700 for data transmission in accordance with an embodiment of the present disclosure.

As shown in FIG. 7, the apparatus 700 includes: an allocating unit 701 configured to allocate resource for transmitting message 3 for a terminal device according to a request for a desired resource for transmitting message 3 transmitted by the terminal device via message 1 transmission; wherein the desired resource is determined by the terminal device according to capability of the terminal device and the size of message 3.

In an embodiment, the request indicates the capability of the terminal device and the size of message 3.

In an embodiment, the desired resource is number of slots, and the allocated resource is frequency resources in multiple slots, which is smaller or equal to the number of slots determined according to the size of message 3.

In another embodiment, the desired resource is number of PRBs, and the allocated resource is PRBs within schedulable bandwidth supported by the terminal device.

In an implementation of this aspect of the disclosure, the allocating granularity of the system bandwidth is adapted with respect to the schedulable bandwidth.

In an implementation of this aspect of the disclosure, the DCI search spaces are different for different schedulable bandwidths.

It should be appreciated that components included in the apparatus 700 correspond to the operations of the method 500. Therefore, all operations and features described above with reference to FIG. 5 are likewise applicable to the components included in the apparatus 700 and have similar effects. For the purpose of simplification, the details will be omitted.

It should be appreciated that the components included in the apparatus 700 may be implemented in various manners, including software, hardware, firmware, or any combination thereof.

In an embodiment, one or more units may be implemented using software and/or firmware, for example, machine-executable instructions stored on the storage medium. In addition to or instead of machine-executable instructions, parts or all of the components included in the apparatus 700 may be implemented, at least in part, by one or more hardware logic components.

For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), and the like.

The apparatus 700 may be a part of a device. But it is not limited thereto, for example, the apparatus 700 may be the network device 201, other parts of the network device 201, such as transmitter and receiver, are omitted in the FIG. 7.

As can be seen from the above embodiments, overhead and delay of small data transmission will be reduced, larger data size transmission in RRC inactive state can be supported, and coverage can be increased accordingly.

Fifth Aspect of Embodiments

A communications system is provided, as shown in FIG. 2, the communication system 200 includes a network device 201 configured to perform a method for data transmission according to the second aspect of embodiments and a terminal device 202 configured to perform a method for data transmission according to the first aspect of embodiments.

A device (such as a network device 201 or a terminal device 202) is provided in an embodiment, and the same contents as those in the first aspect and the second aspect of embodiments are omitted.

Figure 8:
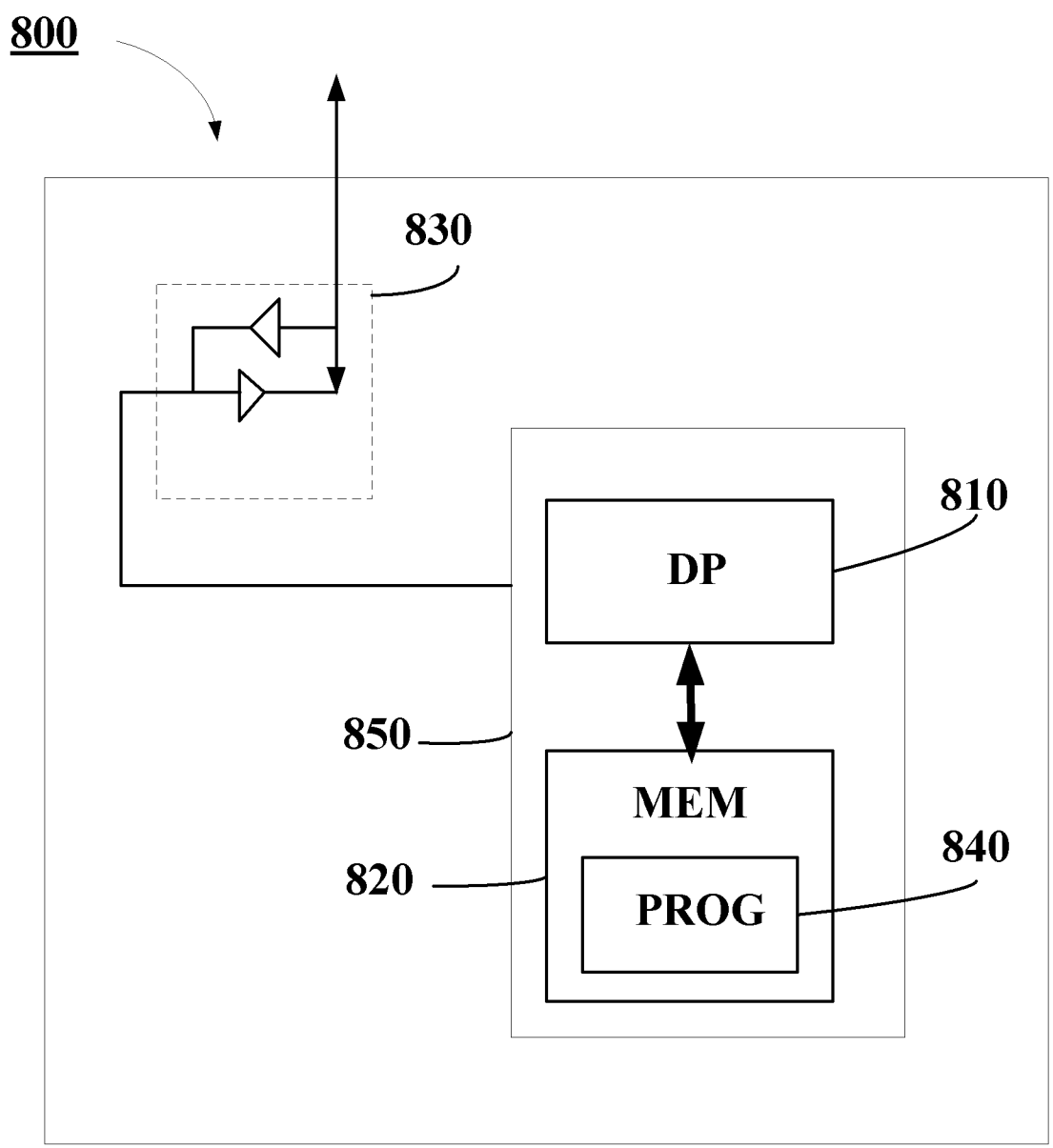
FIG. 8 is a simplified block diagram of a device that is suitable for implementing embodiments of the present disclosure.

FIG. 8 shows a simplified block diagram of a device 800 that is suitable for implementing embodiments of the present disclosure. It would be appreciated that the device 800 may be implemented as at least a part of, for example, the network device 201 or the terminal device 202.

Network device 201 comprises processing circuitry, device readable medium, interface, user interface equipment, auxiliary equipment, power source, power delivery circuitry, and antenna. These components are depicted as single boxes located within a single larger box, and in some cases, contain additional boxes therein.

In practice however, a network device may comprise multiple different physical components that make up a single illustrated component (e.g., interface comprises ports/terminals for coupling wires for a wired connection and radio front end circuitry for a wireless connection). As another example, network device may be a virtual network node. Similarly, network node may be composed of multiple physically separate components (e.g., a NodeB component and a RNC component, a BTS component and a BSC component, etc.), which may each have their own respective components.

In certain scenarios in which network device comprises multiple separate components (e.g., BTS and BSC components), one or more of the separate components may be shared among several network nodes. For example, a single RNC may control multiple NodeB's. In such a scenario, each unique NodeB and RNC pair, may in some instances be considered a single separate network node. In some embodiments, network node may be configured to support multiple radio access technologies (RATs). In such embodiments, some components may be duplicated (e.g., separate device readable medium for the different RATs) and some components may be reused (e.g., the same antenna may be shared by the RATs).

As shown, the device 800 includes a communicating means 830 and a processing means 850. The processing means 850 includes a data processor (DP) 810, a memory (MEM) 820 coupled to the DP 810. The communicating means 830 is coupled to the DP 810 in the processing means 850. The MEM 820 stores a program (PROG) 840. The communicating means 830 is for communications with other devices, which may be implemented as a transceiver for transmitting/receiving signals.

In some embodiments where the device 800 acts as a network device. For example, the memory 820 stores a plurality of instructions; and the processor 810 coupled to the memory 820 and configured to execute the instructions to: allocate resource for a terminal device for transmitting message 3 according to a request for a desired resource for transmitting message 3 transmitted by the terminal device via message 1 transmission, wherein, the desired resource is determined by the terminal device according to capability of the terminal device and the size of message 3.

In some other embodiments where the device 800 acts as a terminal device. For example, the memory 820 stores a plurality of instructions; and the processor 810 coupled to the memory 820 and configured to execute the instructions to: determine a desired resource for transmitting message 3 according to the capability of the terminal device and the size of message 3; and transmit a request for the desired resource via message 1 transmission.

The PROG 840 is assumed to include program instructions that, when executed by the associated DP 810, enable the device 800 to operate in accordance with the embodiments of the present disclosure, as discussed herein with the method 300 or 500. The embodiments herein may be implemented by computer software executable by the DP 810 of the device 800, or by hardware, or by a combination of software and hardware. A combination of the data processor 810 and MEM 820 may form processing means 850 adapted to implement various embodiments of the present disclosure.

The MEM 820 may be of any type suitable to the local technical environment and may be implemented using any suitable data storage technology, such as semiconductor based memory devices, magnetic memory devices and systems, optical memory devices and systems, fixed memory and removable memory, as non-limiting examples. While only one MEM is shown in the device 800, there may be several physically distinct memory modules in the device 800. The DP 810 may be of any type suitable to the local technical environment, and may include one or more of general purpose computers, special purpose computers, microprocessors, digital signal processors (DSPs) and processors based on multicore processor architecture, as non-limiting examples. The device 800 may have multiple processors, such as an application specific integrated circuit chip that is slaved in time to a clock which synchronizes the main processor.

Generally, various embodiments of the present disclosure may be implemented in hardware or special purpose circuits, software, logic or any combination thereof. Some aspects may be implemented in hardware, while other aspects may be implemented in firmware or software which may be executed by a controller, microprocessor or other computing devices. While various aspects of embodiments of the present disclosure are illustrated and described as block diagrams, flowcharts, or using some other pictorial representation, it will be appreciated that the blocks, apparatus, systems, techniques or methods described herein may be implemented in, as non-limiting examples, hardware, software, firmware, special purpose circuits or logic, general purpose hardware or controller or other computing devices, or some combination thereof.

By way of example, embodiments of the present disclosure can be described in the general context of machine-executable instructions, such as those included in program modules, being executed in a device on a target real or virtual processor. Generally, program modules include routines, programs, libraries, objects, classes, components, data structures, or the like that perform particular tasks or implement particular abstract data types. The functionality of the program modules may be combined or split between program modules as desired in various embodiments. Machine-executable instructions for program modules may be executed within a local or distributed device. In a distributed device, program modules may be located in both local and remote storage media.

Program code for carrying out methods of the present disclosure may be written in any combination of one or more programming languages. These program codes may be provided to a processor or controller of a general-purpose computer, special purpose computer, or other programmable data processing apparatus, such that the program codes, when executed by the processor or controller, cause the functions/operations specified in the flowcharts and/or block diagrams to be implemented. The program code may execute entirely on a machine, partly on the machine, as a stand-alone software package, partly on the machine and partly on a remote machine or entirely on the remote machine or server.

The above program code may be embodied on a machine-readable medium, which may be any tangible medium that may contain, or store a program for use by or in connection with an instruction execution system, apparatus, or device. The machine-readable medium may be a machine-readable signal medium or a machine-readable storage medium. The machine-readable medium may include but not limited to an electronic, magnetic, optical, electromagnetic, infrared, or semiconductor system, apparatus, or device, or any suitable combination of the foregoing.

More specific examples of the machine-readable storage medium would include an electrical connection having one or more wires, a portable computer diskette, a hard disk, a random-access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

In the context of this disclosure, the device may be implemented in the general context of computer system-executable instructions, such as program modules, being executed by a computer system. Generally, program modules may include routines, programs, objects, components, logic, data structures, and so on that perform particular tasks or implement particular abstract data types. The device may be practiced in distributed cloud computing environments where tasks are performed by remote processing devices that are linked through a communications network. In a distributed cloud computing environment, program modules may be located in both local and remote computer system storage media including memory storage devices.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the present disclosure, but rather as descriptions of features that may be specific to particular embodiments. Certain features that are described in the context of separate embodiments may also be implemented in combination in a single embodiment. Conversely, various features that are described in the context of a single embodiment may also be implemented in multiple embodiments separately or in any suitable sub-combination.

Although the present disclosure has been described in language specific to structural features and/or methodological acts, it is to be understood that the present disclosure defined in the appended claims is not necessarily limited to the specific features or acts described above. Rather, the specific features and acts described above are disclosed as example forms of implementing the claims.

What is claimed is:

1. A method for data transmission in a terminal device, comprising:
    determining a desired resource for transmitting a message 3 according to the capability of the terminal device and the size of the message 3, wherein a desired resource group is determined based on the size of the message 3 from a mapping table stored in the terminal device, wherein the mapping table comprises different resource groups with different ranges of schedulable bandwidths and different number of resources mapped to different ranges of sizes of the message 3, wherein the capability of the terminal device and the desired resource are not known to a network device operably coupled with the terminal device; and
    transmitting, to the network device, a request for the desired resource via a message 1 transmission, wherein the terminal device selects a random access preamble for the message 1, and wherein the random access preamble is selected based on the desired resource group and the size of the message 3.

2. The method according to claim 1, wherein, the request indicates the size of the message 3 and the capability of the terminal device.

3. The method according to claim 1, wherein, the desired resource is a number of slots, the number of slots is determined according to the size of the message 3 and multiple-slot scheduling capability supported by the terminal device, where the multiple-slot scheduling capability is that the terminal device is able to be scheduled with multiple slots for data transmission.

4. The method according to claim 3, wherein the method further comprises:
    determining a Physical Random Access Channel (PRACH) resource group according to the size of the message 3, from which a random access preamble is selected for message 1 transmission.

5. The method according to claim 3, wherein the method further comprises:
    monitoring a Downlink Control Information (DCI) format for multiple-slot scheduling if the multiple-slot scheduling is requested in the message 1 transmission.

6. The method according to claim 3, wherein the method further comprises:
    monitoring a Downlink Control Information (DCI) format for a single slot scheduling if the multiple-slot scheduling and the single slot scheduling are using different DCI formats.

7. The method according to claim 1, wherein the desired resource is number of Physical Resource Blocks PRBs, the number of PRBs is determined according to the size of the message 3 and schedulable bandwidth capability supported by the terminal device, where the schedulable bandwidth capability is that the terminal device is able to support data transmission or receiving using the allocated PRBs within the schedulable bandwidth.

8. The method according to claim 7, wherein the method further comprises:
    determining a Physical Random Access Channel (PRACH) resource group according to the size of the message 3, from which a random access preamble is selected for message 1 transmission.

9. The method according to claim 7, wherein the method further comprises:
    determining a Downlink Control Information (DCI) format for monitoring according to transmission resource of message 1.

10. The method according to claim 7, wherein the method further comprises:
    determining a Downlink Control Information (DCI) search space according to transmission resource of message 1.

11. A method for data transmission in a network device, comprising:
    allocating a resource for transmitting a message 3 for a terminal device according to a request for a desired resource for transmitting the message 3 transmitted by the terminal device via a message 1 transmission, wherein a desired resource group is determined based on the size of the message 3 from a mapping table stored in the terminal device, wherein the mapping table comprises different resource groups with different ranges of schedulable bandwidths and different number of resources mapped to different ranges of sizes of the message 3, wherein the capability of the terminal device and the desired resource are not known to a network device operably coupled with the terminal device, wherein the request indicates the capability of the terminal device and the size of the message 3, wherein the terminal device selects a random access preamble for the message 1, and wherein the random access preamble is selected based on the desired resource group and the size of the message 3.

12. The method according to claim 11, wherein, the desired resource is number of slots, and the allocated resource is frequency resources in multiple slots, which is smaller or equal to number of slots determined according to the size of message 3.

13. The method according to claim 11, wherein, the desired resource is number of PRBs, and the allocated resource is Physical Resource Blocks PRBs within schedulable bandwidth supported by the terminal device.

14. The method according to claim 13, wherein, the allocating granularity of the system bandwidth is adapted with respect to the schedulable bandwidth.

15. The method according to claim 13, wherein, the Downlink Control Information (DCI) search spaces are different for different schedulable bandwidths.

16. A terminal device, comprising a processor and a memory, wherein the memory containing instructions executable by the processor whereby the terminal device is operative to determine a desired resource for transmitting a message 3 according to the capability of the terminal device and the size of the message 3, wherein a desired resource group is determined based on the size of the message 3 from a mapping table stored in the terminal device, wherein the mapping table comprises different resource groups with different ranges of schedulable bandwidths and different number of resources mapped to different ranges of sizes of the message 3, wherein the capability of the terminal device and the desired resource are not known to a network device operably coupled with the terminal device; and transmit, to the network device, a request for the desired resource via a message 1 transmission, wherein the terminal device selects a random access preamble for the message 1, and wherein the random access preamble is selected based on the desired resource group and the size of the message 3.

17. The terminal device according to claim 16, wherein, the memory containing instructions executable by the processor whereby the terminal device is operative to further perform the method according to claim 2.

\* \* \* \* \*